United States Patent
Yu

(10) Patent No.: US 9,905,974 B2
(45) Date of Patent: Feb. 27, 2018

(54) SHOCKPROOF ELECTRICAL SOCKET

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Wei-Wei Yu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/607,413

(22) Filed: May 26, 2017

(65) Prior Publication Data

US 2017/0346233 A1 Nov. 30, 2017

(30) Foreign Application Priority Data

May 27, 2016 (CN) .......................... 2016 1 0360021

(51) Int. Cl.
| | |
|---|---|
| *H01R 13/44* | (2006.01) |
| *H01R 13/648* | (2006.01) |
| *H01R 13/639* | (2006.01) |
| *H01R 13/46* | (2006.01) |
| *H01R 13/516* | (2006.01) |
| *H01R 13/703* | (2006.01) |
| *H01R 13/24* | (2006.01) |
| *H01R 13/187* | (2006.01) |
| *H02J 11/00* | (2006.01) |

(52) U.S. Cl.
CPC ....... *H01R 13/648* (2013.01); *H01R 13/2414* (2013.01); *H01R 13/44* (2013.01); *H01R 13/46* (2013.01); *H01R 13/516* (2013.01); *H01R 13/6395* (2013.01); *H01R 13/7033* (2013.01); *H01R 13/187* (2013.01); *H02J 11/00* (2013.01)

(58) Field of Classification Search
CPC .......................... H01R 13/447; H01R 13/453; H01R 13/4532; H01R 13/4534
USPC .................................................. 439/137, 145
See application file for complete search history.

(56) References Cited

U.S. PATENT DOCUMENTS

| | | | | |
|---|---|---|---|---|
| 6,739,887 B1* | 5/2004 | Yu | ...................... | H01R 13/4534 439/137 |
| 7,857,640 B1* | 12/2010 | Lee | .................... | H01R 13/4534 439/137 |
| 7,985,085 B2* | 7/2011 | Gao | .................... | H01R 13/4534 439/137 |

* cited by examiner

*Primary Examiner* — Phuong Dinh
(74) *Attorney, Agent, or Firm* — ScienBiziP, P.C.

(57) ABSTRACT

A shockproof electrical socket is connected to a plug comprising a first latch and a second latch. The socket comprises a shell, a first elastic sheet, a second elastic sheet, a first elastic contact mechanism configured to connect the first elastic sheet and the first latch, and a second elastic contact mechanism configured to connect the second elastic sheet and the second latch. The first elastic contact mechanism comprises a first insulation block connected to the shell through a first elastic piece. The first elastic sheet is connected to the shell through a second elastic piece. The second elastic contact mechanism comprises a second insulation block connected to the shell through a third elastic piece. The second elastic sheet is connected to the shell through a fourth elastic piece.

13 Claims, 4 Drawing Sheets

SHOCKPROOF ELECTRICAL SOCKET

CROSS-REFERENCE TO RELATED APPLICATIONS

This application claims priority to Chinese Patent Application No. 201610360021.3 filed on May 27, 2016, the contents of which are incorporated by reference herein.

FIELD

The subject matter herein generally relates to home and industrial safety and an shockproof electrical socket.

BACKGROUND

An electronic shock from a socket is a threat for household electrical safety, especially for families having children. A shockproof socket is desirable.

BRIEF DESCRIPTION OF THE DRAWINGS

Implementations of the present disclosure will be described, by way of example only, with reference to the attached figures.

DETAILED DESCRIPTION

Figure 1:
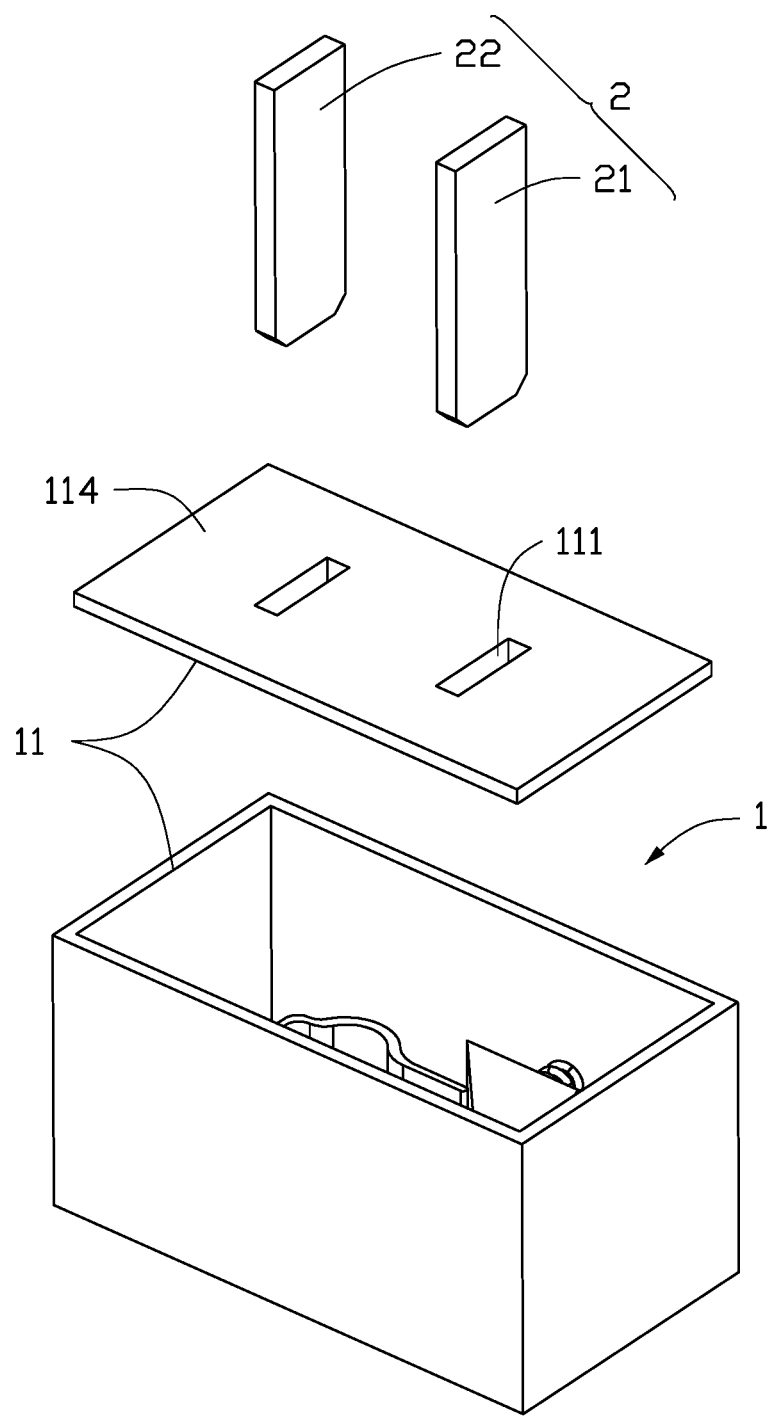
FIG. 1 is an isometric view showing an exemplary embodiment of a shockproof electrical socket.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

The term "comprising" means "including, but not necessarily limited to"; it specifically indicates open-ended inclusion or membership in a so-described combination, group, series, and the like.

Exemplary embodiments of the present disclosure will be described in relation to the accompanying drawings.

Figure 2:
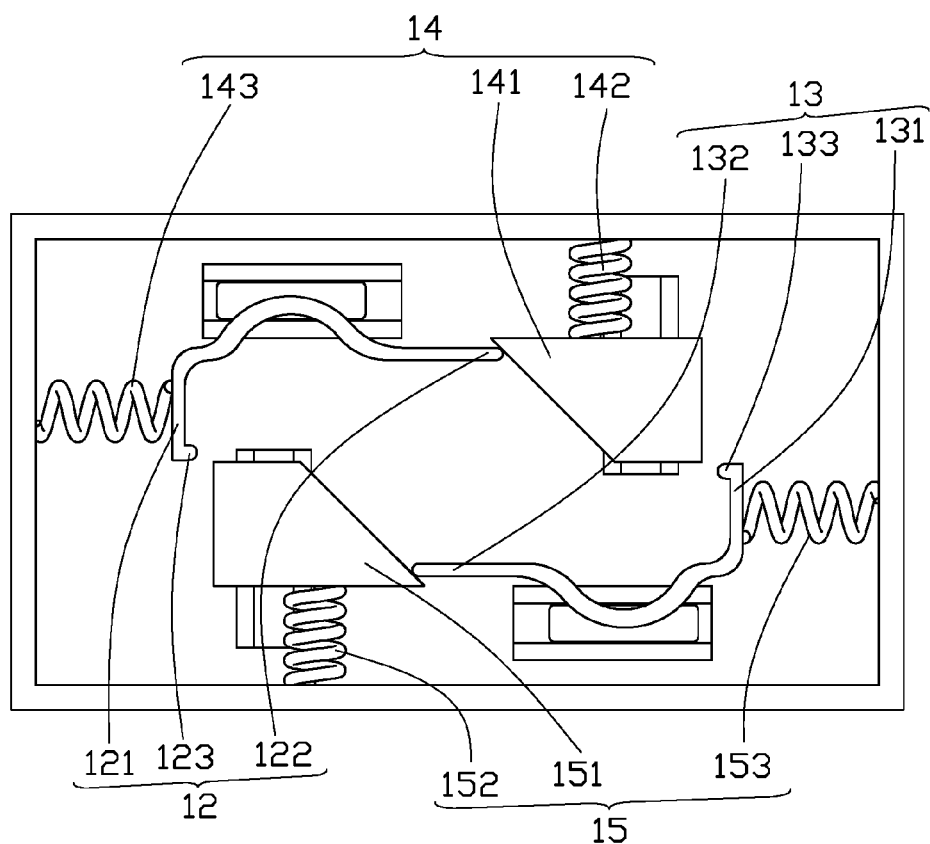
FIG. 2 is a top, isometric view of the socket of FIG. 1.

FIG. 1 illustrates an exemplary embodiment of a shockproof electrical socket (socket 1). The socket 1 can contact a plug 2. FIG. 2 illustrates a top, isometric view of the socket 1 of FIG. 1. The socket 1 includes, but is not limited to a shell 11, a first elastic sheet 12, a second elastic sheet 13, a first elastic contact mechanism 14, and a second elastic contact mechanism 15. In at least one exemplary embodiment, the first elastic contact mechanism 14 and the second elastic contact mechanism 15 have the same structure and are symmetrically set in the socket 1. The shell 11 defines a pair of jacks 111.

The plug 2 includes a first prong 21 and a second prong 22. The first prong 21 and the second prong 22 pass through the pair of jacks 111 and conductively are connected to the socket 1

Figure 3:
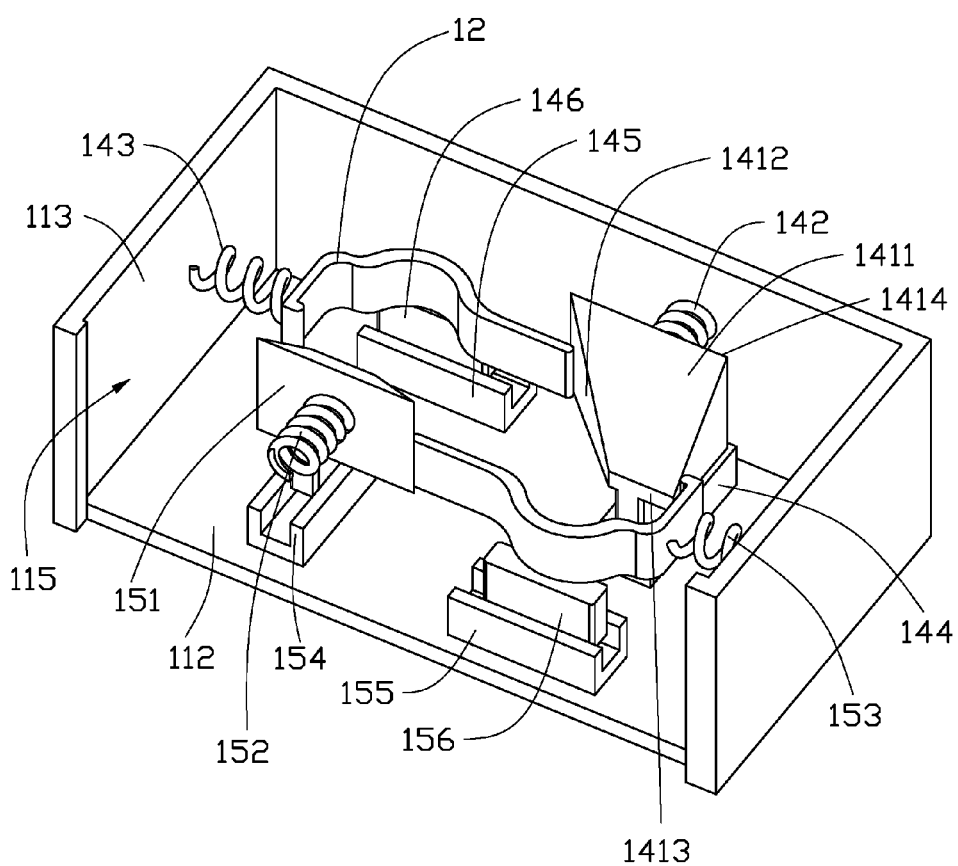
FIG. 3 is a cross-section, isometric view of the socket of FIG. 1.

FIG. 3 illustrates details of the socket 1. The first elastic contact mechanism 14 includes a first insulation block 141, a first elastic piece 142, and a second elastic piece 143. One end of the first elastic piece 142 is connected to the first insulation block 141, the other end of the first elastic piece 142 is connected to the shell 11. One end of the second elastic piece 143 is connected to the shell 11, the other end of the second elastic piece 143 is connected to the first elastic sheet 12. One end of the first elastic sheet 12 away from the second elastic piece 143 rests on the first insulation block 141 to make the second elastic piece 143 compressed.

When the first prong 21 or the second prong 22 rests on the first insulation block 141 through one of the two jacks 111, the first insulation block 141 moves toward a direction of compressing the first elastic piece 142 under the driving of the first prong 21 or the second prong 22. When the first insulation block 141 moves toward compressing the first elastic piece 142 the first elastic sheet 12 moves along the first insulation block 141 to make the second elastic piece 143 release stored elastic force. The first elastic sheet 12 moves along the first insulation block 141 under the driving of the second elastic piece 143.

The second elastic contact mechanism 15 includes a second insulation block 151, a third elastic piece 152, and a fourth elastic piece 153. One end of the third elastic piece 152 is connected to the second insulation block 151, the other end of the third elastic piece 152 connects to the shell 11. One end of the fourth elastic piece 153 connects to the shell 11, the other end of the forth elastic piece 153 is connected to the second elastic sheet 13. One end of the second elastic sheet 13 away from the fourth elastic piece 153 rests on the second insulation block 151 to make the fourth elastic piece 153 compressed.

When the first prong 21 or the second prong 22 rests on the second insulation block 151 through one of the two jacks 111, the second insulation block 151 moves toward a direction of compressing the third elastic piece 152 under the driving of the first prong 21 or the second prong 22. When the second insulation block 151 moves toward compressing the third elastic piece 152, the second elastic sheet 13 moves along the second insulation block 151 to make the fourth elastic piece 153 release stored elastic force. The second elastic sheet 13 moves along the second insulation block 151 under the driving of the fourth elastic piece 153.

In at least one exemplary embodiment, the shell 11 has a hollow cuboid structure. The shell 11 includes bottom shell 112, side wall 113, and upper cover 114 (referring to FIG. 1). The side wall 113 extends vertically from periphery of the bottom shell 112. The upper cover 114 covers the side wall 113. The two jacks 111 are set on the upper cover 114. A receiving space 115 is defined between the bottom shell 112 and the side wall 113. The first elastic sheet 12, the second elastic sheet 13, the first elastic contact mechanism 14, and the second elastic contact mechanism 15 are received in the receiving space 115. The first elastic contact mechanism 14 further includes a first chute 144, a second chute 145, and a first block 146. The first chute 144 and the second chute 145 are set on the bottom shell 112. In at least one exemplary embodiment, an extending direction of the first chute 144 is parallel to the compressive direction of the first elastic piece 142. An extending direction of the second chute 145 is parallel to the compressive direction of the second elastic piece 143. The first block 146 is set in the second chute 145 and can move along the extending direction of the second chute 145. The first elastic sheet 12 is connected to the first block 146. The first elastic sheet 12 can move along the extending direction of the second chute 145 through the first block 146. The first insulation block 141 is set in the first chute 144 and can move along the extending direction of the first chute 144. In at least one embodiment, the first chute 144 and the second chute 145 are U-shaped grooves.

The second elastic contact mechanism 15 further includes a third chute 154, a fourth chute 155, and a second block 156. The third chute 154 and the fourth chute 155 are set on the bottom shell 112. In at least one exemplary embodiment, an extending direction of the third chute 154 is parallel to the compressive direction of the third elastic piece 152. An extending direction of the fourth chute 155 is parallel to the compressive direction of compressing the fourth elastic piece 153. The second block 156 is set in the fourth chute 155 and can move along the extending direction of the fourth chute 155. The second elastic sheet 13 is connected to the second block 156. The second elastic sheet 13 can move along the extending direction of the fourth chute 155 through the second block 156. The second insulation block 151 is set in the third chute 154 and can move along the extending direction of the third chute 154. In at least one embodiment, the third chute 154 and the fourth chute 155 are U-shaped grooves.

Referring to FIG. 2, in at least one exemplary embodiment, the first elastic sheet 12 is curving. The first elastic sheet 12 includes, but is not limited to, a first end 121, a second end 122, and a first conductive column 123.

The first conductive column 123 is set on the first end 121 and can conductively contact the first prong 21 or the second prong 22. One end of the second elastic piece 143 is connected to the first end 121 of the first elastic sheet 12, the other end of the second elastic piece 143 is connected to the side wall 113. The second end 122 of the first elastic sheet 12 rests on the first insulation block 141.

In at least one exemplary embodiment, the second elastic sheet 13 is curving. The second elastic sheet 13 includes, but is not limited to, a third end 131, a fourth end 132, and a second conductive column 133.

The second conductive column 133 is set on the third end 131 and can conductively contact the first prong 21 or the second prong 22. One end of the fourth elastic piece 153 is connected to the third end 131 of the second elastic sheet 13, the other end of the fourth elastic piece 153 is connected to the side wall 113. The fourth end 132 of the second elastic sheet 13 rests on the second insulation block 151.

In at least one exemplary embodiment, the first insulation block 141 includes a first inclined plane 1411, a second inclined plane 1412, a first resting plane 1413, and a first connecting plane 1414. One end of the first elastic piece 142 is connected to the first connecting plane 1414, the other end of the first elastic piece 142 is connected to the side wall 113. The first connecting plane 1414 is parallel to the first resting plane 1413. The first inclined plane 1411 is connected to the first connecting plane 1414 and the first resting plane 1413.

The first inclined plane 1411 can rest on the first prong 21 or the second prong 22, and the first insulation block 141 can compress the first elastic piece 142 under the driving of the first prong 21 or the second prong 22.

The second inclined plane 1412 is connected to the first connecting plane 1413 and the first resting plane 1413. The second end 122 of the first elastic sheet 12 rests on the second inclined plane 1412. When the first prong 21 or the second prong 22 rests on the first inclined plane 1411 and pushes the first insulation block 141 to compress the first elastic piece 142, the first prong 21 or the second prong 22 slides along the first inclined plane 1411 and rests on the first resting plane 1413.

In at least one exemplary embodiment, the second insulation block 151 includes a third inclined plane 1511, a fourth inclined plane 1512, a second resting plane 1513, and a second connecting plane 1514. One end of the third elastic piece 152 is connected to the second connecting plane 1514, the other end of the third elastic piece 152 is connected to the side wall 113. The second connecting plane 1514 is parallel to the second resting plane 1513. The third inclined plane 1511 is connected to the second connecting plane 1514 and the second resting plane 1513.

The third inclined plane 1511 can rest on the first prong 21 or the second prong 22, and the second insulation block 151 can compress the third elastic piece 152 under the driving of the first prong 21 or the second prong 22. The fourth inclined plane 1512 is connected to the second connecting plane 1513 and the second resting plane 1513. The fourth end 132 of the second elastic sheet 13 rests on the fourth inclined plane 1512. When the first prong 21 or the second prong 22 rests on the third inclined plane 1511 and pushes the second insulation block 151 to compress the third elastic piece 152, the first prong 21 or the second prong 22 slides along the third inclined plane 1511 and rests on the second resting plane 1513.

Figure 4:
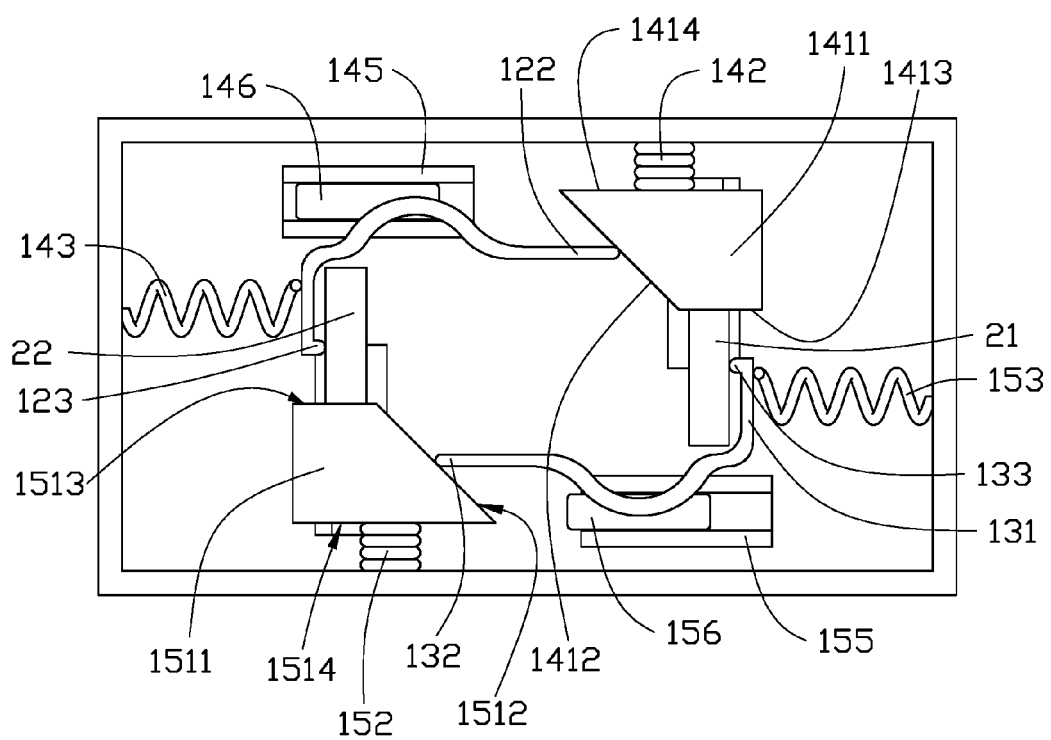
FIG. 4 is an isometric view showing a plug contacting the socket of FIG. 1.

FIG. 4 illustrates the plug 2 contacting the socket 1. The working process of the socket 1 is described. When the first prong 21 or the second prong 22 rests on the first inclined plane 1411 of the first insulation block 141 through one of the two jacks 111, the first insulation block 141 compresses the first elastic piece 142 along the first chute 144 until the first prong 21 or the second prong 22 rests on the first resting plane 1413. When the first insulation block 141 compresses the first elastic piece 142 along the first chute 144, the first elastic sheet 12 slides along the second chute 145. The first elastic sheet 12 slides along the second inclined plane 1412 and the second elastic piece 143 releases the stored elastic force. Thus, under the driving of the second elastic piece 143, the first elastic sheet 12 moves toward the second prong 22 or the first prong 21 along the second chute 145 to make the first conductive column 123 of the first elastic sheet 12 contact the second prong 22 or the first prong 21.

Similarly, when the second prong 22 or the first prong 21 rests on the third inclined plane 1511 of the second insulation block 151 through one of the two jacks 111, the second insulation block 151 compresses the third elastic piece 152 along the third chute 154 until the second prong 22 or the first prong 21 rests on the second resting plane 1513. When the second insulation block 151 compresses the third elastic piece 152 along the third chute 154, the second elastic sheet 13 slides along the fourth chute 155. The second elastic sheet 13 also slides along the fourth inclined plane 1512 and the fourth elastic piece 153 releases the stored. Thus, under the driving of the fourth elastic piece 153, the second elastic sheet 13 moves toward the first prong 21 or the second prong 22 along the fourth chute 155 to make the second conductive column 133 of the second elastic sheet 13 contact the first prong 21 or the second prong 22. Thus, when the first prong 21 pushes the first insulation block 141 and the second prong 22 pushed the second insulation block 151, the first conductive column 123 of the first elastic sheet 12 contacts the second prong 22 and the second conductive column 133 of the second elastic sheet 13 contacts the first prong 21. Thus, the socket 1 and the plug 2 forms a loop to make the socket 1 supply power to the plug 2.

In at least one exemplary embodiment, when only the first prong 21 or the second prong 22 passes through the one of the two jack 111, the first prong 21 or the second prong 22 contact to insulation block 141, 151 and is not conductively connected to the socket 1, thus, the socket 1 has a function of preventing electrical shock.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A shockproof electrical socket configured to connect to a plug comprising a first prong and a second prong, the socket comprising:
    a shell;
    a first elastic sheet;
    a second elastic sheet;
    a first elastic contact mechanism configured to make the first elastic sheet conductively contacting with the first prong or the second prong, comprising:
        a first elastic piece;
        a second elastic piece;
        a first insulation block, wherein the first insulation block is connected to the shell through the first elastic piece, the first elastic sheet is connected to the shell through the second elastic piece, the first elastic sheet rests on the first insulation block to compress the second elastic piece, wherein when the first prong or the second prong pushes the first elastic piece to compress the first elastic piece, the first elastic piece slides along the first insulation block and conductively contacts the second prong or the first prong;
    a second elastic contact mechanism configured to make the second elastic sheet conductively contacting with the second prong or the first prong, comprising:
        a third elastic piece;
        a fourth elastic piece;
        a second insulation block, wherein the second insulation block is connected to the shell through the third elastic piece, the second elastic sheet is connected to the shell through the fourth elastic piece, the second elastic sheet rests on the second insulation block to compress the fourth elastic piece, wherein when the first prong or the second prong pushes the second elastic piece to compress the third elastic piece, the third elastic piece slides along the second insulation block and conductively contacts the second prong or the first prong.

2. The socket as recited in claim 1, wherein the socket further comprises a first chute, a second chute, and a first block, an extending direction of the first chute is parallel to a compressive direction of the first elastic piece, an extending direction of the second chute is parallel to a compressive direction of the second elastic piece, the first block is set in the second chute, the first elastic sheet is connected to the first block, the first insulation block is set in the first chute.

3. The socket as recited in claim 2, wherein the first insulation block comprises a first inclined plane and a second inclined plane connected to the first inclined plane, the first prong rests on the first inclined plane and pushes the first insulation block to compress the first elastic piece, the first elastic sheet rests on the second inclined plane to compress the second elastic piece.

4. The socket as recited in claim 3, wherein the first insulation block comprises a first resting plane, the first resting plane is connected to the first inclined plane and the second inclined plane, the first prong or the second prong slides along the first inclined plane and further rests on the first resting plane when the first prong or the second prong pushes the first insulation block to compress the first elastic piece.

5. The socket as recited in claim 4, wherein the shell comprises a bottom shell, a side wall, and an upper cover, the side wall extends vertically from periphery of the bottom shell, the upper cover covers the side wall.

6. The socket as recited in claim 5, wherein the first elastic sheet comprises a first end, a second end, and a first conductive column, the first conductive column is set on the first end, one end of the second elastic piece is connected to the first end of the first elastic sheet, the other end of the second elastic piece is connected to the side wall, the second end of the first elastic sheet rests on the second inclined plane of the first insulation block.

7. The socket as recited in claim 6, wherein the first elastic sheet is curving.

8. The socket as recited in claim 1, wherein the socket further comprises a third chute, a fourth chute, and a second block, an extending direction of the third chute is parallel to the compressive direction of the third elastic piece, an extending direction of the fourth chute is parallel to the compressive direction of the fourth elastic piece, the second block is set in the fourth chute, the second elastic sheet is connected to the second block, the second insulation block is set in the third chute.

9. The socket as recited in claim 8, wherein the second insulation block comprises a third inclined plane and a fourth inclined plane connected to the third inclined plane, the the first prong or the second prong rests on the third inclined plane and pushes the second insulation block to compress the third elastic piece, the third elastic sheet rests on the fourth inclined plane to compress the fourth elastic piece.

10. The socket as recited in claim 9, wherein the first insulation block comprises a second resting plane, the second resting plane is connected to the third inclined plane and the fourth inclined plane, the first prong or the second prong slides along the third inclined plane and further rests on the second resting plane when the firth prong or the second prong pushes the second insulation block to compress the third elastic piece.

11. The socket as recited in claim 10, wherein the shell comprises a bottom shell, a side wall, and an upper cover, the side wall extends vertically from periphery of the bottom shell, the upper cover covers the side wall.

12. The socket as recited in claim 11, wherein the second elastic sheet comprises a third end, a fourth end, and a second conductive column, the second conductive column is set on the third end, one end of the fourth elastic piece is connected to the third end of the second elastic sheet, the other end of the fourth elastic piece is connected to the side wall, the fourth end of the second elastic sheet rests on the fourth inclined plane of the second insulation block.

13. The socket as recited in claim 12, wherein the second elastic sheet is curving.

\* \* \* \* \*